United States Patent [19]

Meier

[11] Patent Number: 4,899,666
[45] Date of Patent: Feb. 13, 1990

[54] CONVEYING SYSTEM

[75] Inventor: Jacques Meier, Bäretswil, Switzerland

[73] Assignee: SFT AG Spontanfördertechnik, Weinfelden, Switzerland

[21] Appl. No.: 261,132

[22] Filed: Oct. 21, 1988

[30] Foreign Application Priority Data

Nov. 10, 1987 [CH] Switzerland ............ 4365/87

[51] Int. Cl.$^4$ ............................................. B65G 35/04
[52] U.S. Cl. .................................... 104/88; 104/172.3; 198/468.01; 186/49; 186/69
[58] Field of Search .............. 104/172.3, 45, 35, 38, 104/172.5, 172.2, 172.1, 91, 88, 27; 198/750, 468.01, 589, 861.5, 861.3; 186/49, 50, 60, 68, 69

[56] References Cited

U.S. PATENT DOCUMENTS

| | | | |
|---|---|---|---|
| 1,384,191 | 7/1921 | Greenberg | 186/49 |
| 1,792,533 | 2/1931 | Francis | 104/172.3 |
| 2,211,220 | 8/1940 | Verplanck | 104/35 |
| 2,224,799 | 12/1940 | Schmid | 104/172.3 |
| 2,737,288 | 3/1956 | Boots et al. | 104/172.3 |
| 3,418,945 | 12/1968 | Stevenson et al. | 104/172.2 |
| 3,552,322 | 1/1971 | Clowes | 104/172.3 |
| 3,769,915 | 11/1973 | Swartz | 104/172.2 |
| 3,771,464 | 11/1973 | Reiche | 104/172.2 |
| 3,774,545 | 11/1973 | Karlstrom | 104/172.5 |
| 4,061,205 | 12/1977 | Musser | 186/68 |
| 4,151,754 | 5/1979 | Reist | 74/89.2 |
| 4,392,553 | 7/1983 | Foster | 186/61 |
| 4,624,359 | 11/1986 | Gross | 198/750 |
| 4,638,740 | 1/1987 | Rhodes | 104/172.2 |

FOREIGN PATENT DOCUMENTS

| | | | |
|---|---|---|---|
| 0091557 | 3/1983 | European Pat. Off. | |
| 2357444 | 2/1978 | France | |
| 473516 | 8/1952 | Italy | 104/35 |
| 305627 | 10/1968 | Sweden | 104/172.3 |
| 538065 | 7/1973 | Switzerland | |

Primary Examiner—Robert J. Oberleitner
Assistant Examiner—Mark T. Le
Attorney, Agent, or Firm—Walter C. Farley

[57] ABSTRACT

Conveying system with one or more driving members, conveying chains in operative connection therewith and mechanism arranged on said chains and receiving the conveying loads, the conveying chains being guided in chain channels, one or more tracks connecting satellites with one or more central stations. A track comprises a driving station with an associated track and a conveying chain (drag chain) without a return strand running parallel to the track and on whose one end is arranged a conveyed product-receiving mechanism whilst the other end is freely movable. The track connects the driving station (satellite) with a central station or another driving station (satellite).

22 Claims, 8 Drawing Sheets

CONVEYING SYSTEM

The invention relates to a conveying system with one or more driving members, conveying chains in operative connection therewith and with means arranged on said conveying chains which take up the conveying load, the conveying chains being guided in chain channels.

BACKGROUND OF THE INVENTION

With the aid of the construction according to the invention, this conveying system is intended to solve the following product distribution problem. The surface coverage (e.g. in large rooms or larger open areas) with respect to the supply or delivery of a product from and to a central station ideally takes place by means of an autonomous vehicle (e.g. with self-propulsion), which takes up the product to be conveyed at a central station and takes it over the shortest possible distance to a target location. When the surface coverage only involves limited dimensions (e.g. in a restaurant or large canteen) the products can also be distributed by people, but this is extremely personnel-intensive and thus causes special problems. However, the distribution principle remains the same, no matter whether it involves coarse or fine distribution, or distribution carried out directly by people as conveying means. If a vehicle or trolley is used, with or without its own drive, then it makes use of available routes or tracks so that it avoids time/place coincidence with other vehicles (collision) and then returns empty or otherwise to the starting point.

In such a known system the main advantages are the autonomous drive of the load-conveying means and the unlimited crossing possibilities of such means (vehicles). Disadvantages are represented by the difficult monitoring of the instantaneous position and, in the case of unmanned vehicles, the also expensive guidance to the target location and back again. The latter disadvantage can largely be eliminated by tracked vehicles, with all their advantages and disadvantages. However, the use of tracks greatly limits the unrestricted possibility of crossing, whilst the conventional procedure of ground-laid tracks cannot be used everywhere.

SUMMARY OF THE INVENTION

These problems can be largely eliminated with the hereinafter described conveying system, which can be extended to any desired size. This conveying system is based on the following principle. A plurality of paths or tracks, which can be driven in individual and decentralized manner, in each case connects a satellite to a central station or to another satellite. A path or track is a conveying element comprising a reception means (vehicle/trolley) for the product being conveyed, which is fixed to an open-link chain which can be operated in push and pull manner without any return strand and which has a length significantly longer than the track length between satellite and central station or between two satellites, as well as a conveying drive moving the conveying chain backwards and forwards along a track. The conveying chain is not, as is usually the case, a closed endless chain. The tracks can zonally pass into one another, i.e. form common track portions, which join or move apart by means of branches. The entire system is free from crossings and only has branches in the sense of "switch points".

An individual track functions as follows. The open-link chain, which can be operated in push and pull manner is positively engaged with a drive means, e.g. a sprocket, which moves the chain backwards and forwards. To one end of the chain are fixed one or more reception means, which serve to receive the product being conveyed. The other end is guided by the drive means in such a way that the excess, work-free chain can pass freely over said drive means into a chain depository. The chain is pushed and pulled in a chain channel following the track configuration, said chain channel preferably being located centrally in a track for the vehicle carrying the product. This track extends from the satellite, optionally via various "switch points", to the common, central area, from where products are distributed and/or to which a product is brought. A return chain strand is avoided in that the transfer chain is both pushed and pulled and the chain part which is hauled in when pulling, i.e. the chain tail, is deposited in a zone located at the satellite.

Thus, a transfer chain of an individual track, guided by the chain channel which passes along the trolley track, runs from its target station (which from the system standpoint is a satellite and from the apparatus standpoint is a drive station) to the central station, to which also pass other similar tracks. An excessively dense radial arrangement in the vicinity of central station is loosened by tree structures, which lead into the central area by common track portions, into which pass the individual track portions passing via branches from the satellites. Using a structure of identical track or path elements it is also possible to interconnect satellites. As each satellite is provided with a drive means, its transfer means (transfer chain and trolley) can at any time be put into operation, the product being advanced to the first, already occupied common track part, where it remains in the wait position until said track part is free.

From the organizational standpoint it is advantageous to keep common track parts as short as possible and to position them as close as possible to the central area, because they can simultaneously only carry a single track. Into such a central area complete tree structures can converge in radial manner, so that from there it is possible to serve a large number of satellites, or products can be received from a large number of satellites.

In order to make the conveying system according to the invention randomly extendable, a modular structure is used in building block manner, in which the drive stations (satellites), track portions and branches constitute the essential elements. As a function of the intended use of the conveying system, e.g. in the vicinity of people, track passages are provided, which facilitate movement in the vicinity of the tracks.

BRIEF DESCRIPTION OF THE DRAWINGS the distribution problem and the conveying system solving it will now be explained relative to the example of a gastronomical undertaking. This example is particularly favourable, because besides organizational—technical considerations, there is also the aspect of making work easier for personnel and for which the only solution normally provided is self-service.

Before being dealt with in detail, the following drawings are combined in their modular groups to facilitate understanding:

System Survey: FIGS. 1-3
Drive Station (Satellite): FIGS. 4-6
Track: FIGS. 7-8

Switch Points: FIGS. 9-11
Trolley: FIGS. 12-14
Passage: FIGS. 15-17

Figure 1:
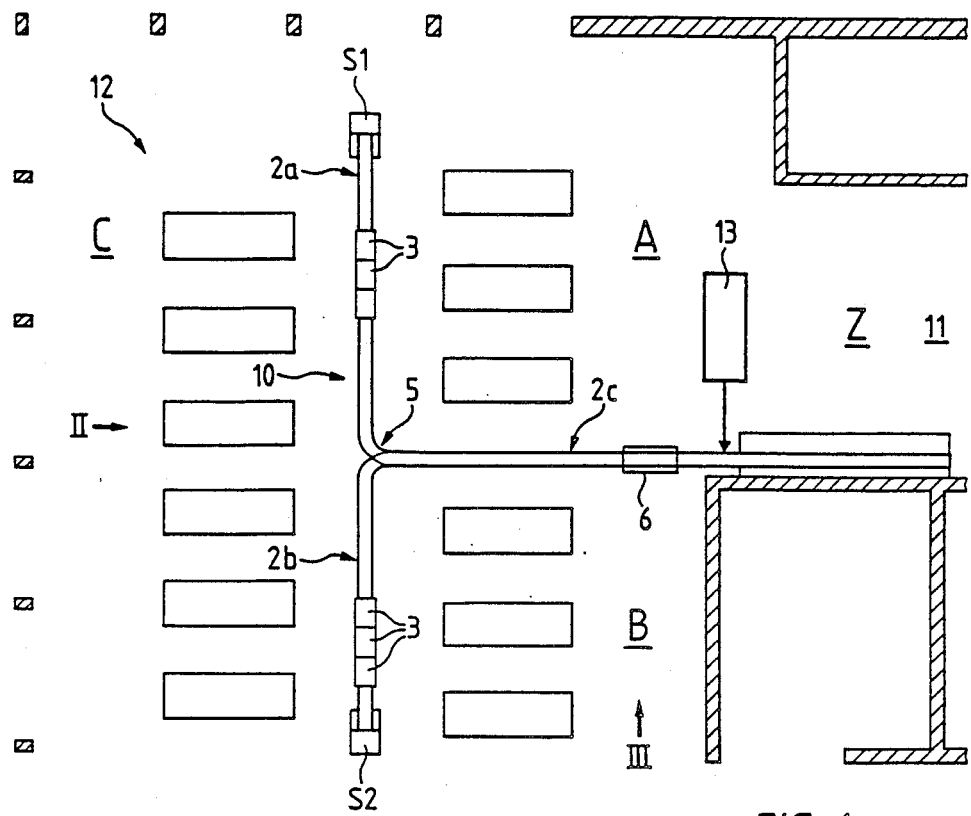
FIG. 1 is a plan view of a typical food service enterprise with a conveying system in T-construction, with two individual and one common track portion, i.e. two satellites and a central area.
Figure 2:
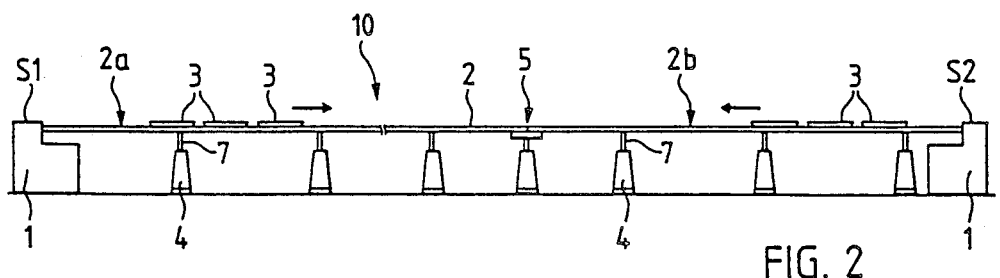
FIG. 2 is a frontal view of the conveying system as viewed in the direction of II in FIG. 1.
Figure 3:
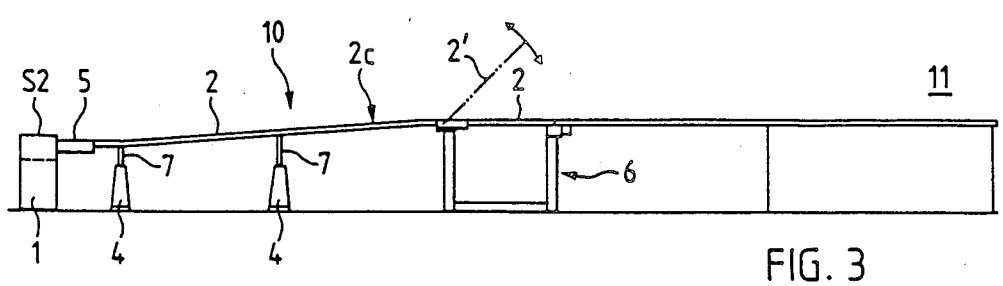
FIG. 3 is the conveying system of FIGS. 1 and 2 as viewed from the side in the direction of arrow III in FIG. 1.

System Survey—FIGS. 1-3

In a gastronomical enterprise the kitchen is the central supply station and the tables of the guests are the target locations to which the ordered meals are conveyed and from which the dirty dishes are conveyed back. As a rule this conveying is carried out by waiters or by the guests themselves in the case of self-service. The presently discussed mechanical conveying system between the kitchen and the dining area has the simplest tree structure, namely with only two branches.

FIGS. 1,2 and 3 show a conveying system 10 with a branch or switch point 5, which connects a kitchen area 11 (central station Z) with a dining area 12 with satellites S1 and S2. This construction of the connection between the central station and the satellites can be called a T-track as a result of its symmetrical shape. It is obvious that the presently discussed system can be extended to form a more complex system with further symmetrical or non-symmetrical branches, but the present simplified arrangement is quite adequate to give a detailed explanation of the invention and in particular to show its universal nature. Thus, FIG. 1 shows such a T-structure viewed from above and FIGS. 2 and 3 the same structure from the front and from the side.

The kitchen area 11 has a control console 13, from which it is possible to control the distribution of the ordered meals, drinks, etc. and also the return of the dirty dishes. This makes it necessary to survey what is taking place and e.g. in the case of a relatively small enterprise this represents no problem. If such a survey is not possible from a central location, it is advantageous to provide besides a central control console, control means on the satellites, so that the fetching or bringing process can also be initiated from there. When waiters are used, it is possible to initiate from the satellites a fine distribution, i.e. the bringing of meals to the tables in the immediate vicinity. This significantly frees the personnel, there is no convergence at the kitchen door and the priority question is mechanically solved.

In busy periods waiting lines form, but no humans are involved therein. At each branch point automatically a waiting process is initiated if one of the joint track portions is occupied and when the latter is freed the fetching or bringing process resumes again. For safety reasons sensors should be provided at all branch points and said sensors ensure that in the case of an occupied, common track portion, no other track can pass into the occupied portion.

Considered from above in FIG. 1, the system has two tracks with a common track portion. One track leads from the satellite S1 via an individual track portion 2a and via a common track portion 2c to the central area Z. Another track leads from another satellite S2 via an individual track portion 2b and via the common track portion 2c to the central area Z. The two individual track portions 2a, 2b are fed into the common track portion 2c via a point-like branch 5.

FIG. 2 shows the system according to FIG. 1 from the direction of arrow II. In the gastronomical field incoming meals, i.e. the product being conveyed, should be conveyed roughly at table height, so that the track is located at a height of 70 to 75 cm by using a plurality of posts 4. It is possible to see on either side of the drawing, which represents the two branches 2a and 2b, the terminal satellites S1 and S2, as well as in each case three vehicles or trolleys 3 in tray form. They are fixed at one end of a not shown transfer chain, whose other end passes over a not shown drive wheel and is depository as the "chain tail" in a deposition zone located in the satellite. As is shown here with two direction arrows, the trays are moved in the direction of the kitchen, so as to collect the ordered meals and/or to return dirty dishes. Both tracks can naturally not simultaneously use the branch 5 and the common track portion 2c, so that the fetching or bringing processes must naturally be carried out successively.

FIG. 3 shows the system from arrow direction III in FIG. 1. Although it is appropriate to convey the incoming meals roughly at table height, this height is inadequate as a working height in the kitchen, so that the track is raised successively to a working height of 90 to 100 cm from a height of 70 to 75 cm by means of a plurality of posts 4. It is possible to see from the left-hand side of the drawings the satellite S2, as well as the "switch point" 5 and emanating therefrom the common track portion 2c, which leads into the kitchen and ends there. In the area between the kitchen and the dining zone is provided a passage 6, so as to facilitate access to the kitchen and/or the supply areas A,B,C subdivided by the track configuration. Such passages are provided wherever they are desirable from the organizational standpoint, because in the case of a conveying height of about 75 cm the tracks form a type of obstacle per se. This is not the case where the track is located overhead (e.g. at a height of 2 meters). However, in gastronomical field preference is given to a height like that shown in the drawings. It is therefore once again pointed out here that the system according to the invention is not bound by any particular conveying height or to a horizontal conveying configuration. The path of a track portion between two different height positions (sitting height, standing height) is also only determined by use.

Therefore the rise from table height (sitting height) to standing working height, i.e. a difference of about 20 cm, takes place successively and the rise will only be gradual, because it is necessary to transport freely standing, slender objects such as e.g. bottles. It is also pointed out that the conveying movement must be completely free from jerks, quite apart from the moderate speed delay values which are usable.

By means of this simple example from the gastronomical field reference has now been made to all the essential elements of the conveying system, namely the satellites, the individual track portions, the common track portions, the converging branches or switch points and to the extent necessary, the passage with the raisable track portion 2'. The fundamental idea of the decentralized "tentacle system", which is combined into a conveying system, is described here on the basis of a system with only two tentacles.

DRIVE STATION—FIGS. 4–6

Figure 4:
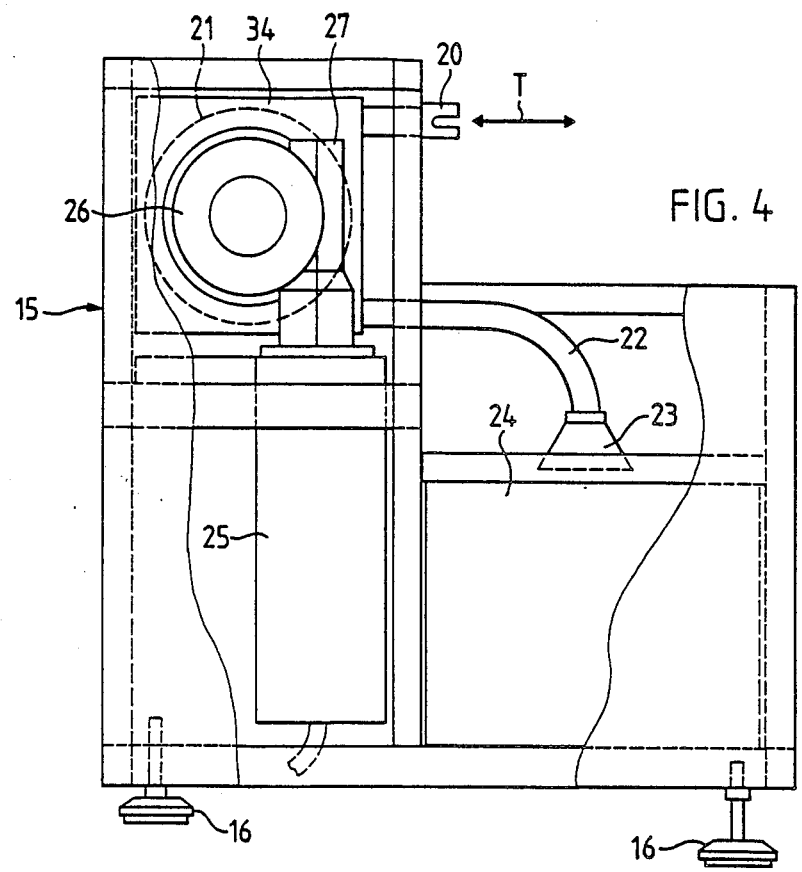
FIG. 4 is a side elevation, partly cut away, of a drive station of a satellite of the conveying system.
Figure 5:
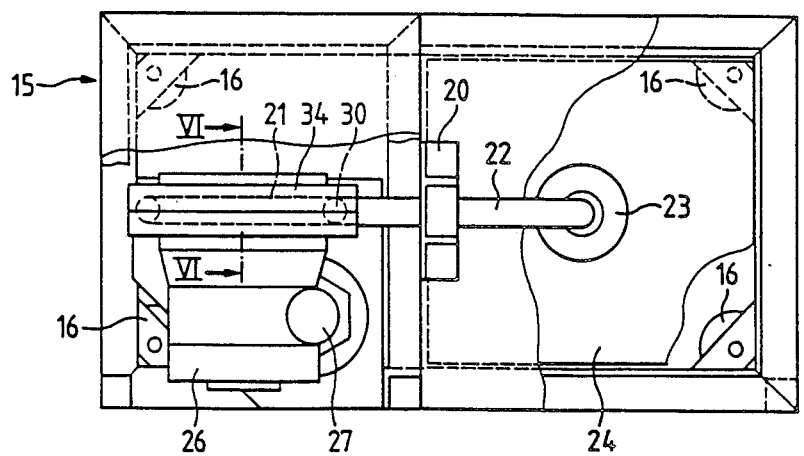
FIG. 5 is the drive station of FIG. 4 in cross-section seen from above.
Figure 6:
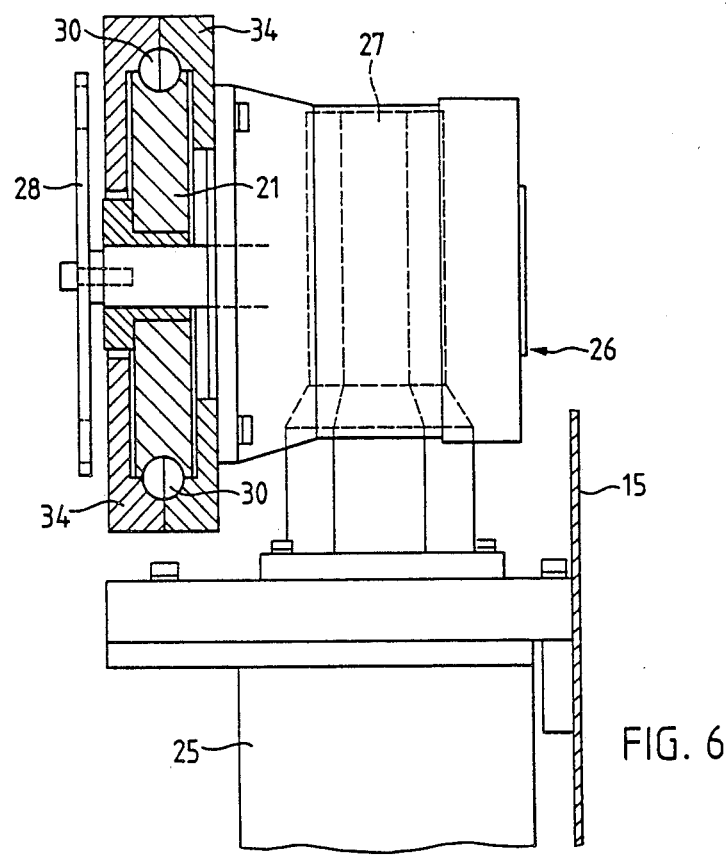
FIG. 6 is a section along line VI—VI in FIG. 5.

FIGS. 4, 5 and 6 show an embodiment of a drive station embodying the satellites in the presently discussed conveying system. FIG. 4 is a partly cut away side elevation of the drive station. The transfer chain motion symbolized by a double arrow T (cf. also the preferred transfer chain 65 in FIG. 12) is introduced through the opening 20 for said chain into casing 15 and passes round a chain driving sprocket or pinion 21, which simultaneously deflects the chain and passes it on into a chain channel 22. The transfer chain finally passes into a chain deposit area 24 where it is deposited in a more or less spiral form. The spiral arrangement of the chain makes it possible to take up the chain again without any special guide means and is assisted by a chain outlet/inlet funnel 23.

The chain driving pinion 21 is driven by a motor 25, which drives the same by means of a gear 26. The motor is in turn either controlled from a central station and/or is moved backwards and forwards, as well as switched on and off at the satellite. Finally, on housing 15, which is a ground standing model, there are adjustable feet 16 for orienting the drive station with respect to the track and which is directly coupled to the opening 20 for the conveying or transfer chain.

FIG. 5 shows the same station, partially cut away, as seen from above showing the aforementioned components from another angle. It is possible to easily see the chain outlet funnel 23, the gear block of gear 26 and the four feet or legs 16. It is pointed out again that the drive station (satellite) together with the track and the transfer chain with the trolley fixed thereto constitutes an independent track or path. From the satellite a "working tentacle" in the manner of a long, extendable, flexible arm is "telescoped" to a target location, in order to take and/or fetch a product being conveyed. Considered from the central station, one or more satellites of possibly a larger number is activated in order to carry out the conveying activity. Track operation between the satellite and central station or between satellites is governed by a track network, which can be extended in modular manner.

FIG. 6 shows in detail the chain driving pinion 21, with a guide 34 of the transfer chain, which ensures a completely satisfactory positive connection between pinion and chain by matching recesses for the chain links. The transfer chain 65 is an open-link chain with spherical parts with which a perfect positive connection is obtained by corresponding spherical indentations in the chain driving pinion 21. As the chain has no return strand and can also not be tensioned, it must be received in a "guide channel" in such a way that it can only move in one dimension i.e. longitudinally (apart from the possible rotation about its own longitudinal axis). A transfer chain channel 30 formed by a chain guide 34 passes along the circumference of the chain driving pinion 21. The drive of the latter preferably takes place by means of a worm gear 27, but other drive types can be chosen for other applications. Finally, to the other side of the gear 26 on the chain driving pinion 21 is coupled a displacement transducer 28, which makes it possible to determine instantaneous position (extended chain length) of the trolley attached to the other chain end.

TRACK—FIGS. 7–8

Figure 7:
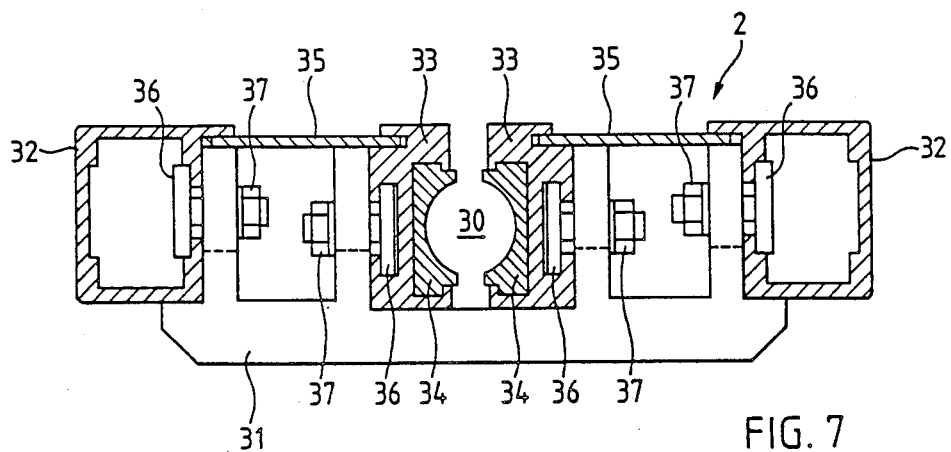
FIG. 7 is a cross-section through a conveying system track portion.
Figure 8:
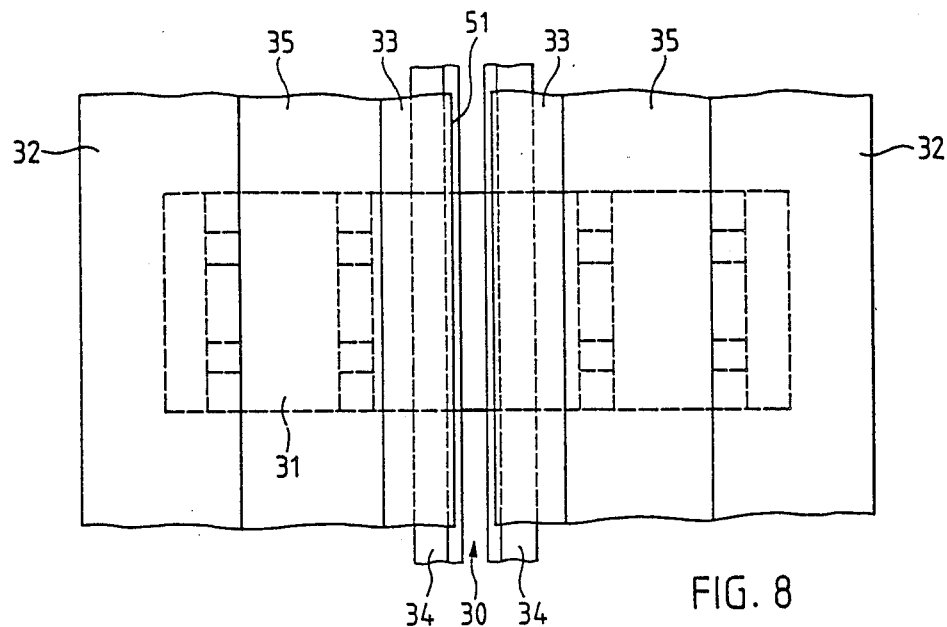
FIG. 8 is a track portion viewed from above.

FIGS. 7 and 8 show an embodiment of the track with an integrated guide for a transfer chain. In the cross-section according to FIG. 7, it is possible to see the most important parts of the track as used in this system. The track has a modular construction and there are straight portions of different lengths, as well as curved portions of different angles, but preferably having the same radius. The most important parts are a profile-like support body 31, which has on either side an external retaining device 32 (preferably a hollow profile) and in the central part an inner retaining device 33 (a half-profile). These retaining devices are fixed to the support body 31 by an outer fastening 36 and an inner fastening 37. In the inner retaining device 33, which is here preferably positioned below the track 35, is provided a transfer chain guide 34, which forms the transfer chain channel 30. The arrangement in which the transfer chain passes below the track is preferred inter alia with respect to the torque action between the chain and the trolley passing along the track. Outer retaining device 32 and inner retaining device 33 retain the track 35, so that the latter can be easily replaced whenever this is required as an interchangeable component. It is equally easy to interchange the transfer chain guides 34, which are preferably made from an anodized, surface-teflonized aluminium, so as to keep the sliding friction between chain and channel uniformly small and to reduce to a minimum the adhesion friction, so that a completely jerk-free operation is permitted. Finally, the support body 31 forms the upper termination of the track connection 7 on the support post 4. The preferred arrangement of the transfer chain with respect to the track is that in which the chain is below the track. This offers advantages in the vicinity of a branch, because above the track the complete switch point means can be free from equipment parts and the trolley moved over the switch point track does not have to be moved past equipment-caused obstacles. The resulting freedom can be used for the design of the trolley.

In FIG. 8, which shows a track portion from above, the relative extent of the support body 31 is shown in broken line form. It is easily possible to see the transfer chain channel 30 and the guide surfaces 51 to be discussed hereinafter.

SWITCH POINTS—FIGS. 9-11

Figure 9:
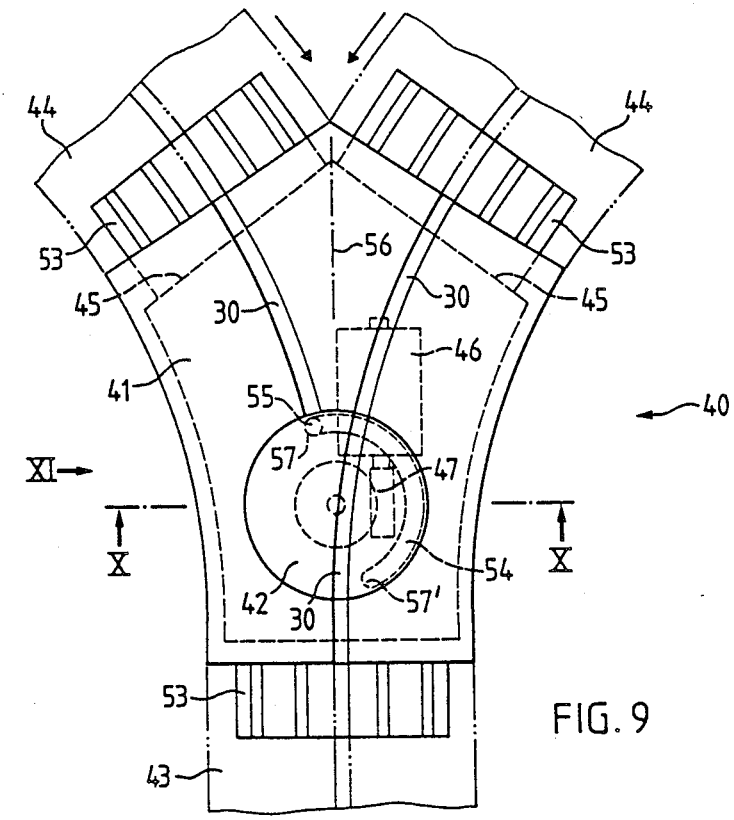
FIG. 9 is an embodiment of a track branch in the sense of a switch point. where two individual track portions converge into a common track portion.
Figure 10:
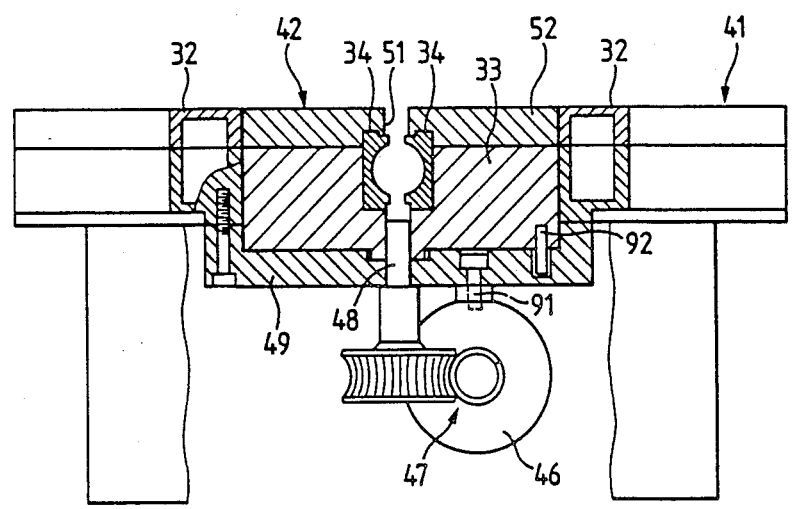
FIG. 10 is a cross-section of the switch point along line X—X in FIG. 9.
Figure 11:
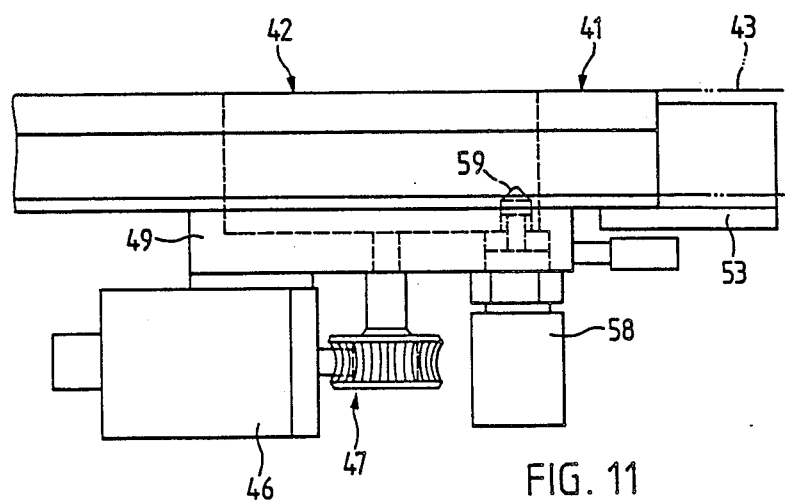
FIG. 11 is a view of the switch point in the direction of arrow XI of FIG. 9.

FIGS. 9,10 and 11 show an embodiment of a means for branching the track which is referred to hereinafter as a switch point, although this term in not completely correct, because a point is generally pivoted, whereas the present means carries out rotary movements.

According to FIG. 9 at switch point 40 it is possible to see from above a point plate 41, which on the one hand assumes the functions of the two converging tracks and on the other surrounds a gap-free rotary piece 42. The two individual track portions 44, as well as the common track portion 43 are connected below the point plate 41, connected by transition pieces 53, to a track butt joint 45. Broken lines also show a point drive 46 and a deflection gear 47 for driving the rotary piece 42.

FIG. 10 shows in section along X—X in FIG. 9 the point body, which is assembled in much the same way as was described in connection with the track. The outer retaining device 32 is screwed to a support body 49 in point plate 41 and through it is guided the point pivot pin 48. To this pivot pin 48 is fixed in rotary manner the inner retaining device 33 with the transfer chain guide 34. Guide 34 comprises two half-profiles, which are spaced in such a way that they so surround the chain 65, which has a circular cross-section (cf. also FIGS. 12 and 13) and carries on one of the chain links a fastening bolt to which the trolley is attached, that said bolt passes through the upper gap and can be moved along the same. For guiding the conveying means (trolley) a guide bolt is provided, which bolt is located in the cover plate 52 of rotary piece 42 and for this purpose, plate 52 has guide faces, one of which is designated 51. The drive part 46 is fixed by means of fastening screws 91 to support body 49 (only one visible here). A device 92 is used for monitoring the position of the rotary piece 42, which is in this case mechanically released, namely by a pin in the lower region of piece 42, which passes in a groove in support body 49.

In the side view of FIG. 11 it is possible to see the arrangement of motor 46 and the deflection gear 47. It is also possible to see one of the adaptor pieces for the common track portion 43. These adaptor pieces are constructed as spacers and connect the track portion to the switch point. There is also an electromagnetic positioning device 58, which by means of a positioning pin 59 precisely positions the rotary disk 42 in such a way that the transfer chain guides 34 and therefore the transfer chain channels are precisely aligned. In order to obtain a self-centering action the positioning pin 59 is conical at the upper end, said cone being inserted in a recess positioned above it in the rotary disk. Centering pin 59 is moved in and out by means of the electromagnetic means 58, which are switchable in simple manner.

The switch point functions as follows. As stated hereinbefore in connection with the description of the branches, said branch behaves in the manner of a rotary disk rather than a point. The objective is that there is to be no deflection of a guide surface (wheel rim) as in the case of a point and instead a complete chain channel part is to be deflected. In addition, said chain channel part is bent (i.e., curved) and must interconnect bent chain channel parts. Once again unlike in the case of a conventional point, the branch is constructed symmetrically and the thus formed symmetry is utilized.

A plane of symmetry 56 (can also be a symmetry axis in other embodiments) subdivides the switch point into two symmetrical track parts. Rotary piece 42 with the integrated transfer chain channel 30 is so arranged in said symmetry that the chain part of the common track portion 43 is divided by said plane of symmetry 56 and the individual track portions 44 are reflected thereon. With such an arrangement two possible manipulations can take place for reversing the branch. There can firstly be a rotation out of the plane on the other side of the mirror plane and secondly there can be a rotation in the plane by 180°, i.e. a half-rotation, which corresponds to a reflection. This latter manipulation is realised in the presently discussed embodiment.

In rotary piece 42 or in the inner retaining device 33 is provided a groove 54, into which projects a stop pin 55. A first stop 57 and a second stop 57' limit the rotation of rotary piece 42 in such a way that the transfer chain parts to be connected are precisely aligned. This is brought about by a point drive 46, which drives a pivot pin 48 via a deflection gear 47. This type of deflection is particularly accident-proof, because it is virtually impossible to pinch a hand resting thereon. This is an advantage of the branch in the present form.

TROLLEY—FIGS. 12-14

Figure 12:
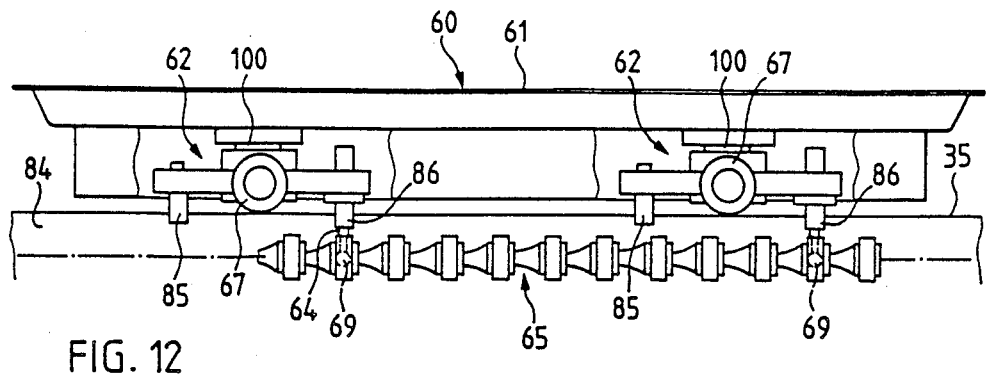
FIG. 12 is a side elevation of an embodiment of a conveying vehicle or trolley.
Figure 13:
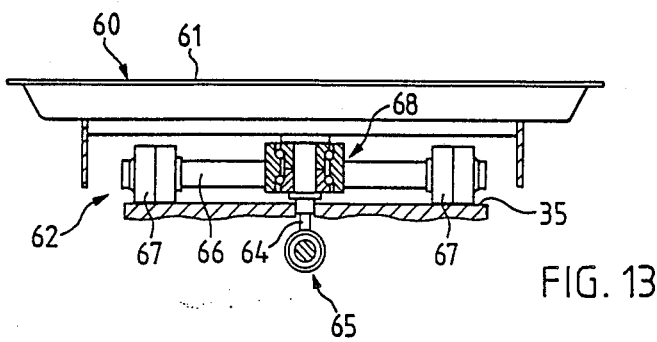
FIG. 13 is a transverse sectional view of the trolley of FIG. 12.
Figure 14:
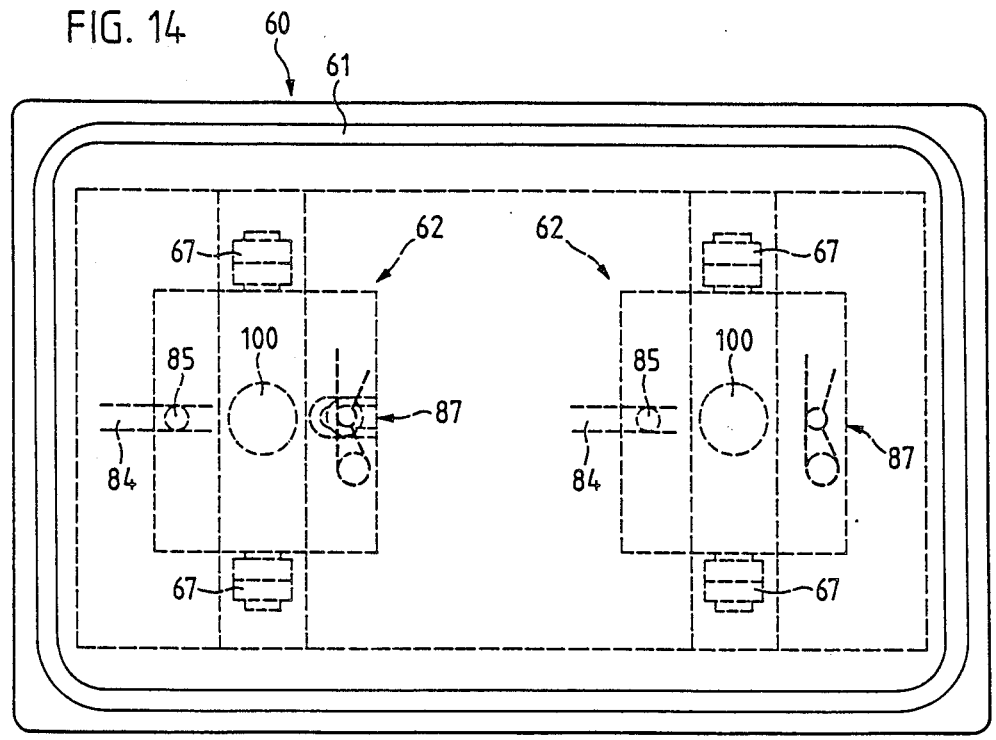
FIG. 14 is a top plan view of the trolley, provided with a tray-like attachment, of FIGS. 12 and 13.

FIGS. 12,13 and 14 show an embodiment of a conveying means, which is in this case a small trolley with a tray-like structure for receiving the product being conveyed, in this case food, drinks and empty dishes.

This embodiment and in particular the tray-like construction is naturally specific to use in a gastronomical enterprise. However, the roller means 62 provided on the transfer chain 65 and rotatable about a vertical shaft 100 can be used in virtually all cases. FIG. 12 shows the trolley 60 from the side with a tray attachment 61 mounted on two roller means 62. Both roller means must be pivotable, so that the trolley can pass round a curve without jerking or pushing. Each roller means 62 has on a roller spindle 66 two rollers 67 (in this case in the form of double rollers) and, apart from fixing to the tray attachment 61, it is also fixed by means of a transfer chain fastening 69 to transfer chain 65. The latter is an open-link chain usable for push and pull operation and such as is e.g. described in Swiss Pat. No. 538 065. At roughly the same distance from pivot bearing 68 (shaft), but pointing in the opposite direction, a guide pin 64 is arranged on the roller means 62 and passes in a guide slot 84 of the transfer chain channel 30. It slides along guide surface 51 (FIG. 10), in the same way as the shaft bearing 86 and the two together force the roller means 62 to have the specified alignment or orientation along the transfer chain channel 30.

FIG. 13 shows in section the other view of roller means 62 with the roller 67 on a roller shaft 66, rotatably fitted to a pivot bearing 68, whose pin 64 is fixed to a transfer chain fastening 69.

FIG. 14 shows a practical clamping device 87, with which a tablet attachment 61, which is fixed to the two roller means 62, can be detached from the transfer chain 65 by a simple handle and can equally easily be coupled again. This makes it possible for the personnel to easily replace, without using a tool, a trolley which is e.g. running in an unsatisfactory manner.

PASSAGE—FIGS. 15-17

Figure 15:
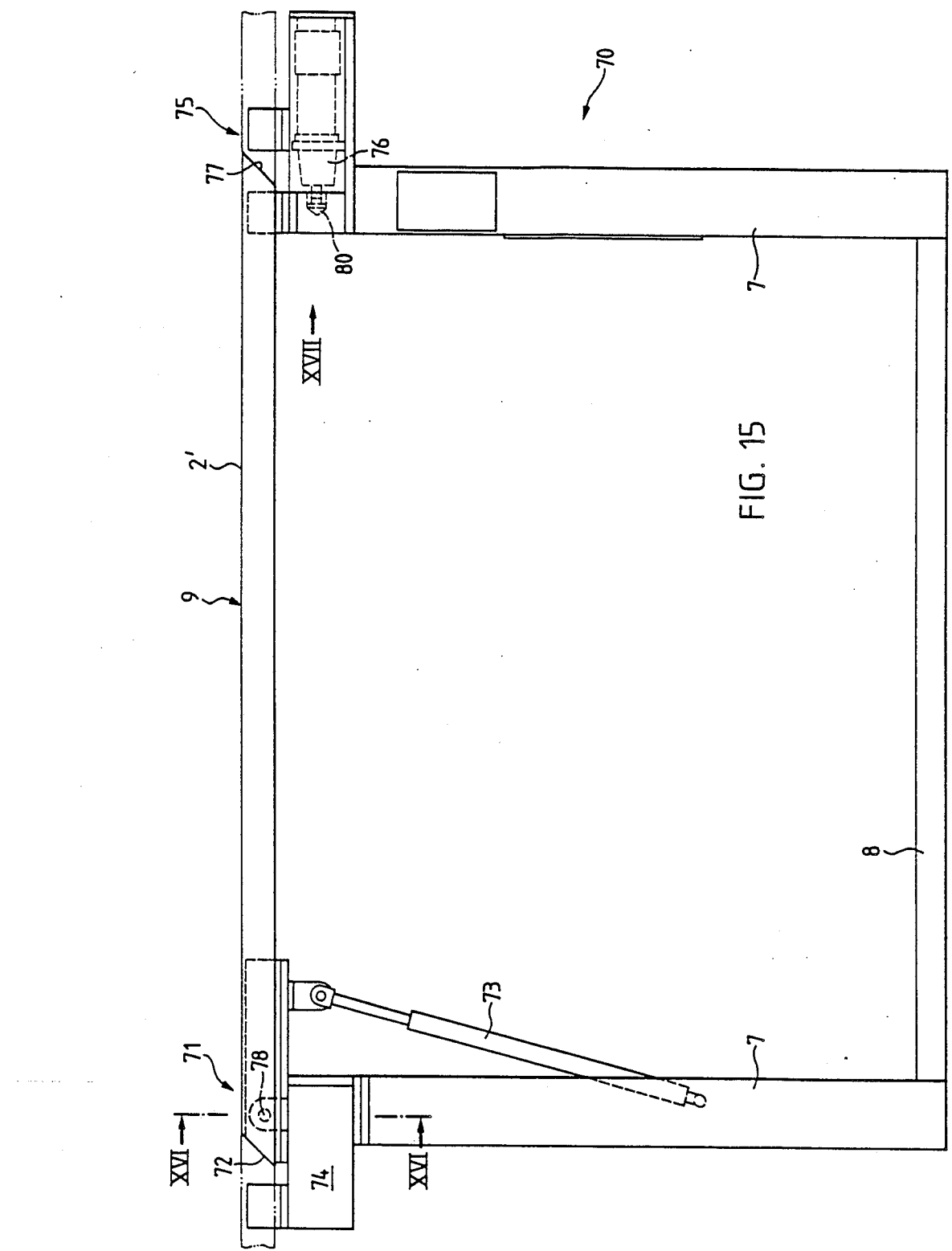
FIG. 15 is a side elevation of an embodiment of a passage through the track, in which a track portion can be swung up.
Figure 16:
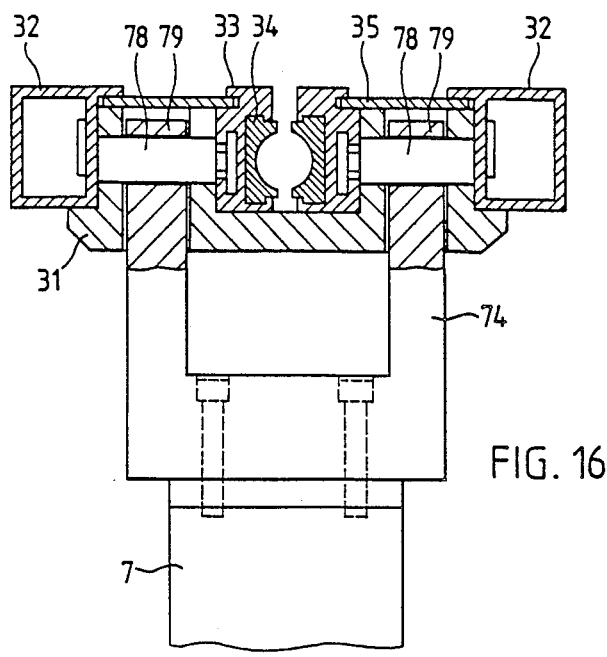
FIG. 16 is a transverse sectional view along line XVI—XVI of FIG. 15.
Figure 17:
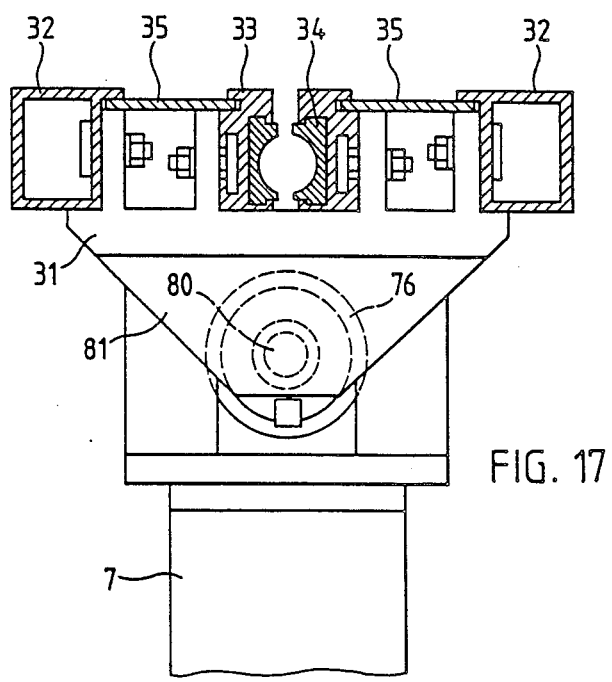
FIG. 17 is a transverse sectional view of the passage in the direction of arrow XVII in FIG. 15.

FIGS. 15,16 and 17 show an embodiment of a passage, which makes it possible to walk through an area equipped with the conveying system according to the invention, in this case the dining area of a gastronomical enterprise with the subdivisions A,B and C.

A passage as indicated at 6 in FIG. 1 and at 70 in FIG. 15, essentially comprises two supports 7 and between them on the floor a cable subway 8. There is also an upwardly foldable track part 8 guided by means of supports 7 and which is arranged in rotary manner on a hinge of passage 70.

As has been stated hereinbefore, the tracks pass roughly at table height through the dining area and in this way "structure" the said dining area. In the presently represented embodiment the common track portion passes from the kitchen area into the dining area upto the branch. Following the branch the two individual track portions diverge in opposite directions. This T-shape is preferably so introduced into the table arrangement that tables are positioned on either side of the T-arms (cf. FIG. 1) and the T-beam is left free for access to the tables. In order to pass unimpeded into both zones on each side of the T-beam, a passage is necessary in the common track portion, as was described hereinbefore. It is clear that correspondingly more passages must be planned in the case of a more complex structure of the conveying system.

Such a passage is advantageously constructed so that it can be folded or swung up. Thus, for opening the passage the upward space is utilized, which is more advantageous from the space standpoint that the downward space. To enable this process to be carried out simply, safely and comfortably, the weight of the track portion to be pivoted is so compensated e.g. by means of a gas pressure spring 73, that only little force is required for the swinging up action.

FIG. 15 shows the passage from the front. The two main supports 7 are interconnected by means of a cable subway 8 on the floor. One of the two supports carries the hinge 71 about which the track portion is pivoted. The other support has a preferably electromagnetically operable locking device 75 (for safety locking) with a safety switch 76 for the switching on and off of the power supply. It must naturally be ensured that when the passage is open all transfers in said section are stopped and that when the track is "occupied" the track part to be opened cannot be swung up. This function is served by means and measures to which reference is made in conjunction with FIGS. 16 and 17, which show a section XVI—XVI through the hinge part and a view XVII of the locking part.

FIG. 16 shows a section through the track and through the hinge part, whereby it is possible to see the hinge pin 78, which is mounted in rotary manner in a shaft bearing 79. The latter is advantageously arranged in the connecting part 74, which is here located in a recess in the support body 31 of the upwardly flappable track part. Connecting parts 74 is on one side screwed to the support 7 and on the other side to the track. This ensures an adequately firm connection between the fixed and the movable track parts. The bevel 72 is such that pivoting without jamming is possible and it must be ensured that the resulting gap is as narrow as possible. This can be achieved in that the hinge mounting is as close as possible beneath the track and to the gap. Experience has shown that vibrations of the trolley when rolling over the joint are negligible, particularly if the wheel diameter is sufficiently large.

FIG. 17 shows the second transition point of the upwardly foldable track part with respect to the track. As a result of the supporting bevels 77 shown in FIG. 15, this transition point can be made substantially without gaps. At this point in the system importance is attached to the locking and/or switching means for ensuring safety, as stated hereinbefore. In conjunction with the side view of FIG. 15, it is possible to see an electromagnetically operable bolt 82, which can be moved in and out with respect to a latch part 81. The locking and unlocking can firstly take place in active manner using electromagnetic means and secondly said bolt 80 can be so set up in position-dependent manner that in certain positions it opens the circuit for the portion with the integrated passage and only closes it again when the bolt is in the correct position. This correct position of bolt 80 is brought about by latch part 81, namely in such a way that on unlatching the bolt by flapping up the track part, same passes into the "off position" and by flapping down and latching again it is brought into the "on position". For locking the track, bolt 80 is moved by the electromagnet means into a locking position (e.g. deeper into the latch recess), so that the upwardly foldable track part is mechanically locked. This is only one of the possible embodiments and is intended to ensure personnel and operational safety and security, because it is a randomly manipulatable system part and must consequently be correspondingly secure. As stated, this passage is mainly used for movement of personnel, but it is also possible to use such passages, in much the same way as automatic carriers, for the movement of goods only. In this case the passages would be remotely controlled and measured for counteracting random actions can be obviated.

I claim:

1. A conveying system comprising the combination of
   a central station;
   a plurality of satellite stations;
   guide means defining a plurality of paths, each path extending between one of said satellite stations and a selected one of said central station and satellite stations;
   a plurality of elongated, single-strand, transfer chain members, each of said chain members being longitudinally movable in said guide means along one of said paths;
   a plurality of drive means for longitudinally bidirectionally driving said chain members, each of said drive means being housed at one of said satellite stations and being coupled to only one of said chain members so that a single drive means bidirectionally drives a single chain member along a predetermined one of said paths, extending and retracting a distal end thereof; and
   a plurality of load conveying means, one of said load conveying means being coupled to each of said chain members near said distal end thereof whereby each of said load conveying means is moved toward and away from an associated one of said satellite stations as the drive means in said one of said satellite stations retracts and extends a chain member coupled thereto.

2. A conveying system according to claim 1 and further comprising tracks for said load conveying means, said tracks being arranged to follow said paths defined by said guide means.

3. A conveying system according to claim 2 and further comprising branch means for joining the paths defined by selected ones of said guide means into common path portions having a common guide means.

4. A conveying system according to claim 3 wherein said branch means comprises a switch point joining two path portions into a single path portion.

5. A conveying system according to claim 3 wherein said branch means includes means for merging the tracks associated with merging paths, including transition pieces with chain channels therein.

6. A conveying system according to claim 2 wherein said guide means and said tracks are supported above the level of a floor and include means for opening said guide means and tracks to allow passage of a person across a path.

7. A conveying system according to claim 6 wherein said means for opening includes a hinged portion of said guide means and tracks arranged to allow a section thereof to be pivoted upwardly.

8. A conveying system according to claim 7 wherein said means for opening includes a safety switch for deactivating at least that portion of said system including said means for opening when said section thereof is pivoted upwardly.

9. A conveying system according to claim 1 wherein each of said load conveying means is a trolley.

10. A conveying system according to claim 1 wherein said guide means includes an elongated guide channel dimensioned to slidably support one of said chain members, said track being supported adjacent said guide channel.

11. A conveying system according to claim 10 wherein said track comprises a support surface for said load conveying means and said guide channel is positioned centrally with respect to said support surface.

12. A conveying system according to claim 11 wherein said guide channel is below said support surface.

13. A conveying system according to claim 12 wherein said guide channel comprises a pair of inwardly facing half-profiles.

14. A conveying system according to claim 10 wherein each of said drive means comprises a chain pinion positively coupled to a chain member, said chain member extending in one direction from said pinion to said distal end and in the other direction to a chain depository for receiving chain drawn into said satellite station by said pinion.

15. A conveying system according to claim 14 wherein each said chain member passes around about 180° of its associated pinion.

16. A conveying system according to claim 10 wherein each of said load conveying means is a trolley having two roller assemblies and a tray attachment.

17. A conveying system according to claim 16 wherein said track comprises a pair of support surfaces separated by a guide slot leading to said guide channel, said trolley being movable on said support surfaces, each of said roller assemblies having a guide pin projecting through said slot into said guide channel and engaging said chain member whereby each said roller assembly is positively driven and guided by said chain member.

18. A conveying system according to claim 1 and further comprising tracks for said load conveying means, said tracks being arranged to follow said paths defined by said guide means, and branch means for joining the tracks defined by selected ones of said guide means into common path portions having a common track portions.

19. A conveying system according to claim 18 wherein each said branch means includes a rotary member having a guide portion for connecting two merging guide channels into a common guide channel and two track portions into a common track.

20. A method of operating a conveying system of the type including a central station, a plurality of satellite stations, guide means defining a plurality of paths, each path extending between one of the satellite stations and one of the satellite stations or the central station, a plurality of elongated, single-strand, transfer chain members longitudinally movable in the guide means along one of the paths, and load conveying means coupled to each of the chain members near the distal end thereof, comprising the steps of providing a chain drive at each one of the satellite stations, coupling each chain drive to only one of the chain members so that a single drive bidirectionally and longitudinally drives a single chain member along a predetermined path, extending and retracting a distal end thereof relative to its associated satellite station, whereby each of the load conveying means is moved toward and away from the associated satellite station and away from and toward another selected satellite station or the central station as the chain drive in said one of said satellite stations retracts and extends the chain member coupled thereto.

21. A method according to claim 20 wherein paths from a plurality of satellite stations join at branch locations and merge into a common path, including suspending extension of chain members from all but an identified one of the satellite stations into a branch location when that branch location is occupied by a chain member operatively associated with the identified one satellite station.

22. A method according to claim 20 and including the step of controlling the chain drive of the satellite stations to suspend the operation of the chain drive extending a chain member toward a branch when a load conveying means associated with another satellite station is in a common track portion.

* * * * *